United States Patent [19]

Horiuchi et al.

[11] 4,167,218
[45] Sep. 11, 1979

[54] MACHINE TOOL ARRANGEMENT

[75] Inventors: Tatsuya Horiuchi, Yokohama; Michio Nawa, Tokyo; Akira Tsujimura, Yokohama; Mitsuru Kubota, Higashimine; Tomoaki Osada, Chiba; Seiji Manabe, Sunto; Hiromu Iwasawa, Yokohama, all of Japan

[73] Assignee: Kabushiki Kaisha Meidensha, Tokyo, Japan

[21] Appl. No.: 773,122

[22] Filed: Feb. 28, 1977

[51] Int. Cl.² .................................................. E21B 3/00
[52] U.S. Cl. .................................. 173/163; 408/239 R
[58] Field of Search .......................... 173/163; 90/110; 408/239 A, 141, 1

[56] References Cited
U.S. PATENT DOCUMENTS

| 2,924,152 | 2/1960 | Zettler | 408/239 A |
| 3,374,711 | 3/1968 | Saunders | 408/239 A |
| 3,678,801 | 7/1972 | Hague et al. | 408/239 |
| 3,762,271 | 10/1973 | Poincenot | 408/239 A |
| 3,898,911 | 8/1975 | DeCaussin | 173/163 |

Primary Examiner—Robert A. Hafer
Attorney, Agent, or Firm—Haseltine, Lake & Waters

[57] ABSTRACT

A machine tool arrangement comprising a main electric motor including a rotor having a hollow cylindrical rotor shaft intergral therewith and extending therethrough. A hollow driving spindle is disposed coaxially with the rotor shaft and the spindle is inserted in the rotor shaft at one end thereof for relative axial and rotation movement. The spindle is driven in rotation by the rotor and it is provided at its opposite end with an arbor-receiving opening. A draw rod extends through the rotor shaft and the spindle and has an externally threaded end engageable in the internally threaded opening in the arbor for securely attaching the arbor to the spindle. A positioning mechanism serves for adjusting the position of the arbor relative to a workpiece.

8 Claims, 6 Drawing Figures

MACHINE TOOL ARRANGEMENT

BACKGROUND OF THE INVENTION

1. Field of the Invention

This invention relates to a machine tool arrangement and, more particularly, to an arrangement wherein an arbor with a cutting tool mounted thereon is adapted to be driven by an electrical motor.

2. Description of the Prior Art

Known is a machine tool arrangement wherein an upright spindle connected at one end to a rotor shaft of a driving motor has an opening at its lower end in which a complementary arbor is adapted to be conformably received and fixed circumferentially to the spindle with a plurality of bolts. For example, if the arbor is relatively large, two workers are required for fixing; while one supports the arbor as it is received in a spindle opening, the other fixes the arbor to the spindle by means of the bolts. Alternatively, if one worker is to do the work, he must fix the arbor in the spindle opening with the aid of an auxiliary support stand which supports the arbor.

This process is very time-consuming and quite dangerous. Further it is difficult to provide an automatic fixing of the arbor.

SUMMARY OF THE INVENTION

It is, therefore, an object of this invention to provide a machine tool arrangement for driving a cutting tool whereby an arbor can easily be fixed in a safe manner in an opening in an output spindle of a driving motor.

Another object of this invention is to provide a machine tool arrangement which allows an arbor to be fixed automatically to an output spindle of a driving motor.

According to this invention, there is provided a machine tool arrangement comprising a main electric motor including a rotor therein, said rotor having a hollow cylindrical rotor shaft integral therewith and extending therethrough, a hollow driving spindle disposed coaxially with said rotor shaft, said spindle being inserted in said rotor shaft at one end thereof for relative axial movement and rotation, said spindle being driven in rotation by said motor, said spindle having an opposite end provided with an arbor-receiving opening, a drawrod extending through said rotor shaft and said spindle and having an externally threaded end an arbor having an internally threaded opening engageable with said externally threaded end for securely attaching said arbor to said spindle, and adjusting means for adjusting the position of said arbor relative to a workpiece.

The drawrod may consist of two shorter rod sections aligned and splined at their adjacent ends to each other so as to change the whole length of the drawrod thereby to allow use with various cutter motor arrangements having different axial lengths.

The drawrod may be driven by an auxiliary variable-speed motor for fixing and detaching of the arbor.

The fastener may be connected through a clutch to and driven by the auxiliary motor in order to attach and detach the arbor to and from the spindle. The driving shaft of the auxiliary motor may have thereon a fan for cooling the main motor.

A mechanism may be provided for stopping a possible undesirable rotation of the rotor shaft of the main motor while the arbor is being attached to and detached from the spindle. The stopping means includes a stop pin adapted to be actuated electro magnetically, when the arbor is to be attached to and detached from the spindle, to engage with and stop a possible undersirable rotation of a balancing flywheel mounted on the rotor shaft of the main motor, which balancing flywheel prevents a rotary oscillation of the rotor due to unequal distribution of the mass of the rotor.

A reduction gear mechanism may be provided for reducing the rotational speed of the spindle. This allows use of a high-speed, small sized electric motor as the main motor thereby to obtain a low-speed, small-sized machine tool arrangement. The reduction gear mechanism may include a final driven output shaft coaxially surrounding and splined to the spindle and planetary gears disposed between the rotor shaft of the main motor and the final output shaft.

Means is provided for adjusting the position of the arbor and a corresponding cutting tool mounted thereon relative to the workpiece. The adjusting means may include a worm and rack mechanism provided outside the spindle.

Other objects, features and advantages of this invention will become more apparent from the following discription taken in conjunction with the accompanying drawings in which like reference numerals and characters designates corresponding parts and elements and in which:

DESCRIPTION OF PREFERRED EMBODIMENTS

Figure 1:
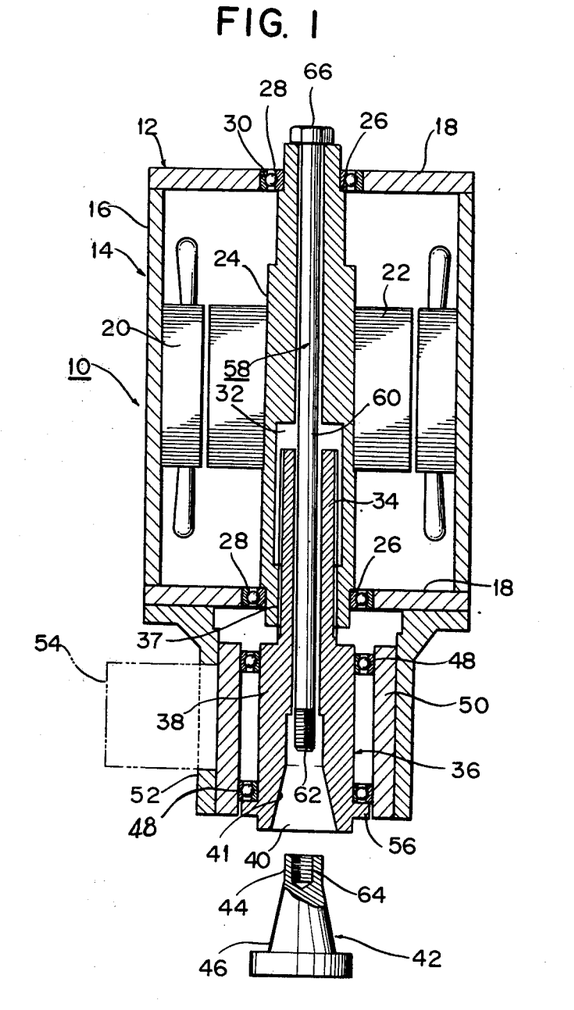
FIG. 1 shows a longitudinal sectional view of a preferred embodiment of a machine tool arrangement according to this invention.

Referring to FIG. 1, there is shown a preferred embodiment of a machine tool arrangement according to this invention, designated generally by reference numeral 10. The arrangement includes a main electric motor 12 for driving a cutting tool (not shown). The motor has a casing 14 which includes an open-ended hollow cylindrical portion 16 with upper and lower end covers 18 closing the opposite ends of the cylindrical portion 16. The motor includes stator members 20 disposed on the internal surface of the casing and a rotor 22 within the stator members 20.

The rotor 22, has a hollow shaft 24 supported rotatably at its shoulders 26 near the opposite ends thereof by a pair of bearings 28 received in openings 30 at the centers of the end covers 18 respectively. The hollow shaft 24 has an enlarged internal diameter cavity 32 therein near its lower end for facilitating insertion of an upwardly extending reduced diameter end portion 34 of an arbor driving spindle 36 into the inside of the rotor shaft 24. The spindle 36 is splined to the rotor shaft 24 at the lower end 37 of the rotor shaft so as to move axially relative to the shaft. The spindle 36 which is internally hollow, includes a lower enlarged outer diameter portion 38 having therein an arbor holding opening 40 open at the lower end thereof and complementary to the shape of an arbor 42 which includes an upper cylindrical portion 44 and a lower downwardly divergent, or upwardly tapering, portion 46.

The spindle 36 is supported rotatably through a pair of upper and lower bearings 48 in a hollow cylindrical quill 50 which in turn is supported in a cylindrical housing 52 secured at its upper end to the lower end cover 18 of the casing 14. The spindle 36, the bearings 48 and the quill 50 are adapted to move together upwardly and downwardly relative to the quill housing 52 and the rotor shaft 24.

A mechanism for adjusting the position of the arbor 42 secured to the spindle 36 and therefore a cutter tool (not shown) mounted thereon relative to the surface of a workpiece to be cut, is shown schematically by a block 54 and may be similar in structure and function to that described later in detail and shown at 54d in FIG. 6.

The spindle 36 has a circumferential flange 56 near its lower end thereby to support the lower bearing 48 thereon.

A drawrod 58 has a shank 60 removably inserted through the rotor shaft 24 and the spindle 36. The shank 60 has outer threads 62 at its lower end appearing in an upper portion of the arbor receiving hole 40 in the spindle 36. The arbor 42 has at its upper surface an inside threaded opening 64 complementary to the outer threaded end of the bolt 58.

When the arbor 42 is desired to be attached to the spindle 36, it is substantially fitted in the opening 40 in the spindle 36 for example with the aid of a support stand thereby to align the opening 64 in the arbor 42 with the axis of the bolt shank 60. Then the bolt is rotated at its head 66 thereby to be screwed at its lower threaded end into the arbor 42. This causes the arbor 42 to be drawn upwardly and to be attached firmly against the complementary internal tapering surface 41 of the opening 40 in the spindle 36.

In order to detach the arbor from the spindle, it is only necessary to drive the bolt 58 in the opposite direction to that in which the arbor is attached to the spindle 36.

Figure 2:
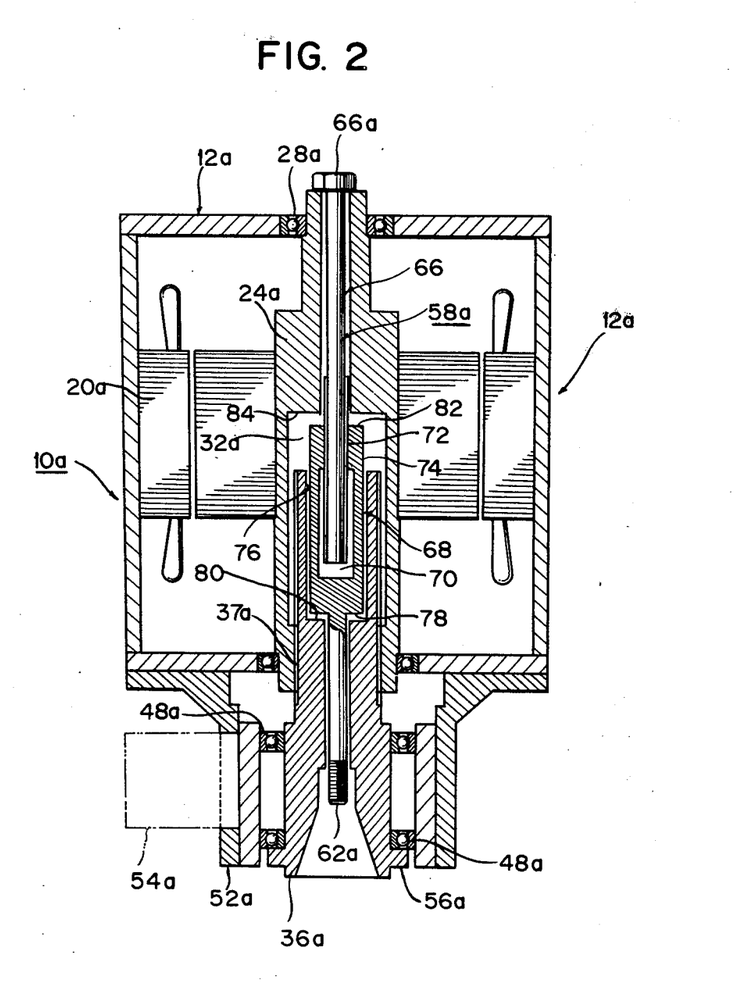
FIG. 2 shows a similar view of a first modification of the FIG. 1 embodiment.

A modification of the FIG. 1 embodiment, shown in FIG. 2 will be now described only with respect to its structural and functional points different from those of the FIG. 1 embodiment.

In the modification shown in FIG. 2, bolt 58a consists of two upper and lower shorter sections 66 and 68 which are alined with and splined to each other in such a manner that the whole length of the bolt can be changed. More particularly, the upper section 66 of the bolt is inserted axially movably at its lower portion in an axial opening 70 in and splined at 72 to an upper enlarged diameter cylindrical portion 74 of the lower section 68 which is received in an enlarged opening 76 in an upper portion of the spindle 36a.

Rotation of bolt 58a in such a direction that arbor 42 is tightened against spindle 36a, will cause drawrod 58 to be engaged with arbor 42 disposed in vertical alignment with the drawrod. As the tightening operation proceeds, the arbor 42 is drawn upwardly and then the cylindrical portion 74 of the lower drawbolt section 68 is pressed at its lower end 78 against a shoulder 80 in the upper opening 76 in the spindle thereby attaining firm attachment of the arbor to the spindle. When the arbor is desired to be detached from the spindle, the drawbolt is loosened. The enlarged diameter portion 74 of the lower drawbolt section 68 is then pressed at its upper end 82 against an upper shoulder 84 of opening 32a in rotor shaft 24a thereby finally allowing the arbor to be detached from the spindle 36a.

Description will next be given concerning a second modification shown in FIG. 3. The description relates to only the structural and functional points different from the structures and operations of the FIG. 1 embodiment and FIG. 2 modification. Such a way of description applies also to other succeeding modifications.

Figure 3:
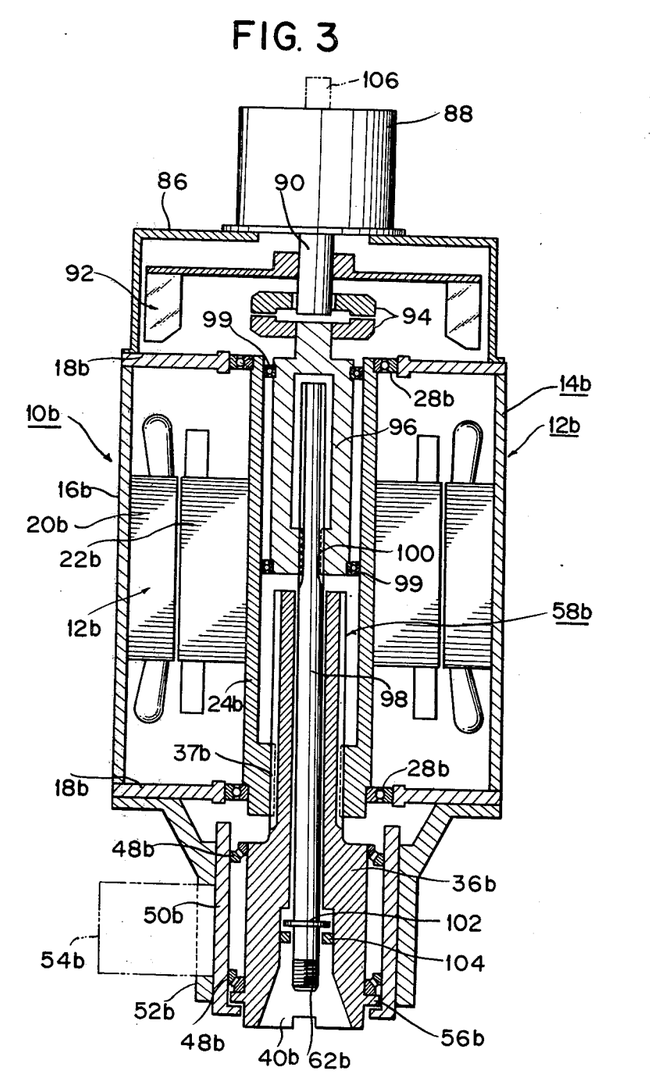
FIG. 3 shows a similar view of a second modification of the FIG. 1 embodiment.

The FIG. 3 modification includes a blower housing 86 of the upper surface of the upper cover plate 18b of the casing 14b. Mounted on the housing 86 is an auxiliary variable-speed motor 88 of for example a direct current type and having a vertical driving shaft 90 which extends downwardly into the housing 86. The shaft 90 mounts a blower impeller 92 thereon in the housing 86 for vertilating the main motor 12b. The shaft 90 further is adapted to be connected through a clutch 94 to a drawrod 58b which consists of an upper hollow cylindrical section 96 open downwardly, and a lower rod-like section 98 inserted at its upper portion into and splined at 100 to the upper section 96. The upper section is firmly connected at its upper end to the clutch 94 and received rotatably through a pair of upper and lower bearings 99 in hollow rotor shaft 24b. The lower section 98 can move axially relative to the upper section 96. The lower drawrod section 98 has a collar 102 slightly above lower outer threads 62b thereof and adapted to be received on a thrust bushing 104 provided at the upper internal circumference of the arbor receiving opening 40b in spindle 36b. The shaft 90 of the auxiliary motor 88 has an upward extension shown by a phantom line 106 for allowing a manual drive of the shaft 90 thereby to attach and detach the arbor to and from the spindle. The drawrod may be a single rod-like member, or of the type shown in FIG. 2.

Driving of the auxiliary motor 88 at an adequate speed of for example about 1800 r.p.m. with the clutch 94 disconnected, will cause the blower impeller 92 to bring about sufficient ventilation to cool the main motor 12b.

When the arbor is to be attached to spindle 36b, the clutch 94 is connected and the auxiliary motor 88 will be rotated. Driving of the motor 88 and therefore the drawrod 58b at an adequate speed of for example about 100 r.p.m. will easily bring about desirable attachment and detachment of the arbor to and from the spindle.

Figure 4:
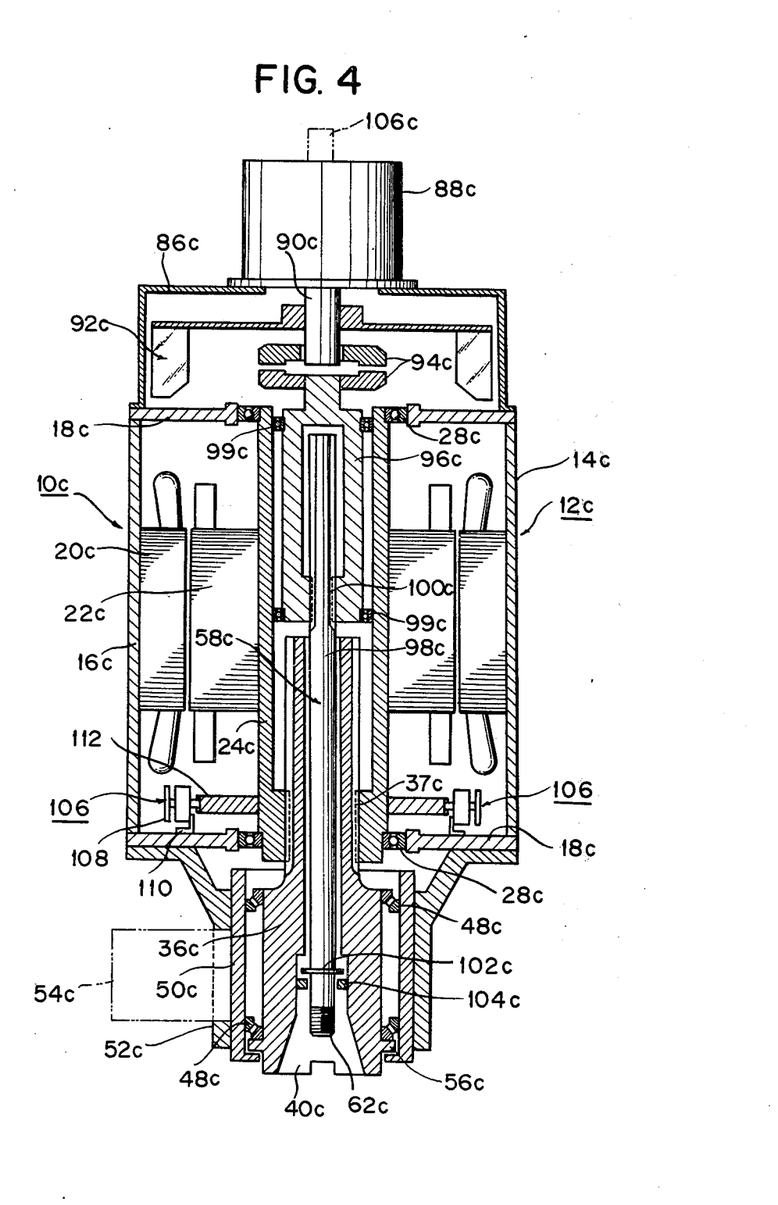
FIG. 4 shows a similar view of a third modification of the FIG. 1 embodiment.
Figure 5:
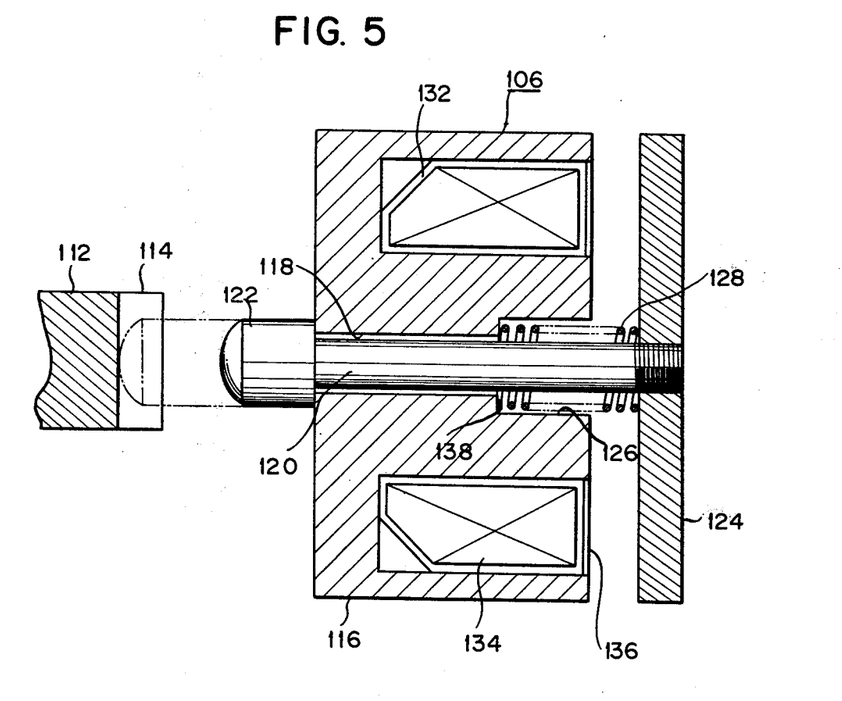
FIG. 5 shows a sectional view of stopping means incorporated in the FIG. 4 modification for stopping an undesirable rotation of a rotor shaft of a main driving motor an arbor while being attached to and detached from a driving spindle.

A third modification shown in FIG. 4 has a mechanism 106 for stopping a possible undesirable rotation of rotor shaft 24c at a time of attaching and detaching the arbor to and from spindle 36c. The stopping mechanism includes a plurality of electromagnetically actuated stopping means 108 disposed equidistantly along the outer periphery of a balancing flywheel 112 mounted on the lower end portion of rotor shaft 24c. Each stopping means is supported by a corresponding lug 110 on the internal surface of lower end cover 18c of the motor casing 14c. The flywheel 112 acts to prevent an undersirable rotary oscillation of rotor 22c due to unequal distribution of the mass of the rotor. The flywheel has a plurality of grooves 114 disposed equispacedly throughout the outer periphery thereof, one of which grooves is shown in FIG. 5.

Each stopping means includes an iron core or yoke 116 having a center bore 118 through which a stopping pin 120 is received movably in the axial direction thereof. The stopping pin has an enlarged head 122 at that end of the pin 120 facing flywheel groove 114 and a magnetizable pressing disc 124 at the other end. The center bore 118 has an enlarged bore portion 126 at the end thereof facing the disc 124 in which bore portion a return coil spring 128 is received coaxially around the stop pin 120 and slightly pressed between the disc 124 and an inward end 138 of the enlarged bore portion 126. The iron core has an annular recess 132 open on the side of the disc 124 in which recess an exciting coil 134 is snugly received and covered with an annular cover plate 136. The coil 134 is adapted to be excited by a suitable source of power substantially at the same time when clutch 94c is actuated into a drive condition.

When clutch 94c is engaged, the coil 134 is excited substantially at the same time. The pressing disc 124 is then drawn magnetically to the left as viewed in FIG. 5 against the action of return spring 128. Thus the pin 120 is pressed against the balancing flywheel 112, particularly against a corresponding groove 114 at the outer periphery thereof thereby to completely stop possible rotation of rotor shaft 24c. This will allow only driving of drawrod 58c thereby efficiently attaching and detaching the arbor to and from spindle 36c. When clutch 94c is disconnected, the exciting coil 134 is also deenergized. This will cause return spring 128 to return the stopping pin 120 to its normal position as shown at a solid line in FIG. 5 thereby allowing free rotation of balancing disc 112 and rotor shaft 24c.

Figure 6:
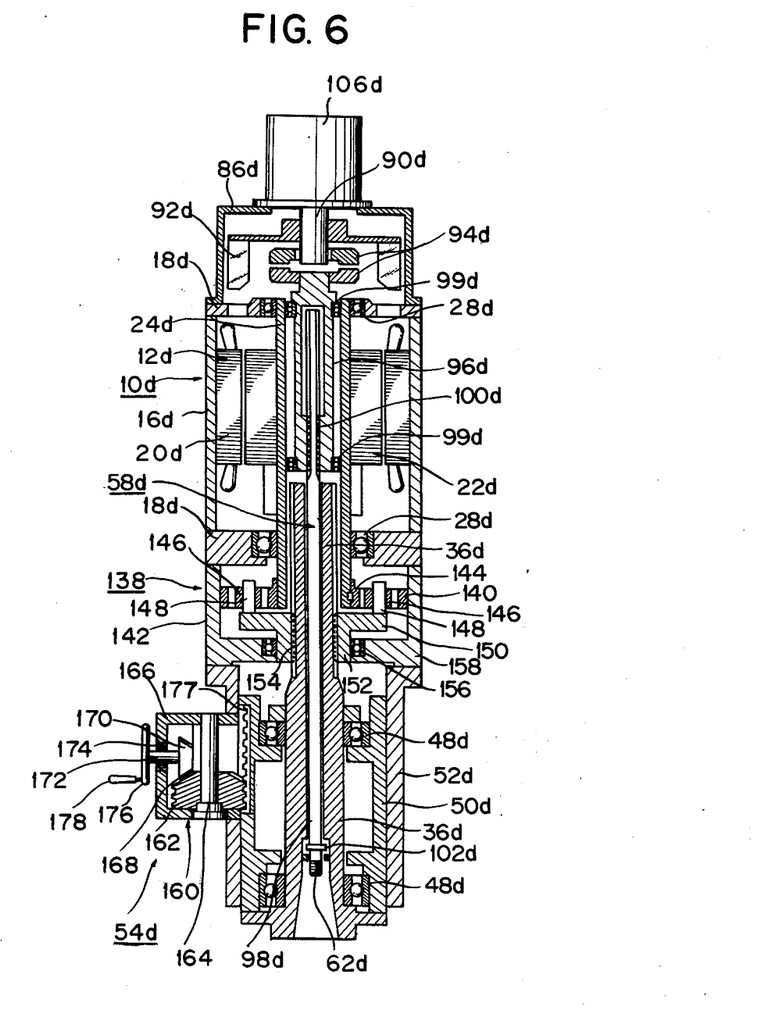
FIG. 6 shows a similar view of a fourth modification of the FIG. 1 embodiment.

A fourth modification of this invention shown in FIG. 6 includes a planetary reduction gear mechanism 138 for reducing the speed of revolution of spindle 36d. The mechanism includes an annular internal gear 140 disposed coaxially on the internal surface of a housing 142 mounted between lower cover plate 18d of main motor 12d and quill housing 52d. It further includes a sun gear 144 mounted on a lower end of rotor shaft 24d and a plurality of planet gears 146 (for example two, meashing with and between the gears 140 and 144. Planet gears 146 have shafts 148 secured to a collar 150 of a final driven hollow output shaft 152 which is firmly fitted over and splined at 154 to spindle 36d and which is received rotatably through a bearing 156 in a lower end plate 158 of housing 142. This will allow use of a high-speed electric motor which, generally speaking, is of a small size and of a small consumption of electric power compared with a low-speed motor.

Now, referring again to FIG. 6, description will be made of a mechanism for adjusting the axial position of the arbor and therefore a cutting tool (not shown) mounted thereon relative to a work piece (not shown). This mechanism designated generally at 54d includes a box-like housing 160 mounted on the wall of quill housing 52d, a worm 162 supported pivotally by an upright pivot shaft 164 which in turn is supported by upper and lower plate-like portions 166 of housing 160. The worm 162 has a bevel gear 168 at its top meshing with a second bevel gear 170 which in turn has a horizontal shaft 172 supported rotatably through a bearing 174 received in the wall of housing 160. Shaft 172 has at its outward end a drive wheel 176 with a handle 178.

The worm 162 meshes with a rack 177 provided at the outer periphery of quill 50d. When the handle 178 is rotated, the quill 50d and the spindle 36d will be together moved upwardly or downwardly relative to quill housing 52d, depending upon the direction of rotation of drive wheel 176, thereby to give a required cutting position of the arbor and therefore a cutting tool mounted thereon relative to a work piece (not shown).

This invention has further advantages as follows: Attachment and detachment of the arbor to and from the spindle can be easily made by driving only a single drawrod. This will allow automation of attachment and detachment of the arbor to and from the spindle. Since the drawrod is operated to draw the arbor upwardly at a time of attachment the same, the arbor can be attached to the spindle as it is placed on a floor, thereby bringing about obtaining a high efficiency and a high degree of safety in attachment and detachment of the arbor. The rotary speed and output torque of the drawrod can be set to desried values by controlling the auxiliary motor, for example in such a manner that a torque imparted to the drawrod for attaching the arbor to the spindle is different from a torque imparted to the drawrod for detaching the arbor from the spindle.

Although one preferred embodiment and several modification of this invention have been illustrated and described, it is believed evident to those skilled in the art that many changes and variations may be made without departing from the spirit and scope of this invention. Accordingly this invention is to be considered as being limited only by the following claims.

What is claimed is:

1. A machine tool arrangement comprising a main motor including a hollow casing, a stator secured coaxially within said casing, and a rotor extending coaxially within said stator, said motor having a hollow cylindrical rotor shaft integral therewith and extending coaxially therethrough, a hollow driving spindle disposed coaxially within said rotor shaft, said spindle being inserted in said rotor shaft at one end thereof for relative axial movement and rotation, said spindle being driven in rotation by said motor, said spindle having an opposite end provided with an arbor-receiving opening, a drawrod extending through said rotor shaft and said spindle and having an externally threaded end, an arbor having an internally threaded opening engageable with said externally threaded end for securely attaching said arbor to said spindle, and adjusting means for adjusting the position of said arbor relative to a workpiece, said adjusting means including a hollow cylindrical quill housing secured at one end to said main motor casing, a hollow cylindrical quill received coaxially in said quill housing and supporting said spindle rotatably therein so as to slide axially relative to the spindle and the casing, and means for axially displacing said quill relative to said quill housing and said spindle.

2. A machine tool arrangement according to claim 1 wherein said spindle is splined to said rotor shaft, and said drawrod comprises two aligned sections which are spline connected to each other so that the length of said drawrod can be changed.

3. A machine tool arrangement according to claim 1 wherein said spindle is splined to said rotor shaft, and said arrangement further includes an auxiliary motor for driving said drawrod thereby to attach and detach said arbor to and from said spindle.

4. A machine tool arrangement according to claim 3 wherein said auxiliary motor includes a driving shaft, said arrangement further comprising a clutch means for connecting and disconnecting said driving shaft to and from said drawrod.

5. A machine tool arrangement according to claim 4 further including a fan secured on said driving shaft of said auxiliary motor for cooling said main motor.

6. A machine tool arrangement according to claim 1 wherein said spindle is splined to said rotor shaft, said arrangement further including a balancing flywheel secured to said hollow rotor shaft of said motor for preventing rotary oscillation of said rotor due to unequal distribution of the mass of said rotor, said balancing flywheel having a plurality of grooves extending throughout the outer periphery thereof, means disposed adjacent the outer periphery of said balancing flywheel for stopping rotation of said rotor shaft when said arbor is attached to and detached from said spindle, said stopping means including a stop pin adapted to be electromagnetically actuated and pressed against one of said grooves at the outer periphery of said balancing flywheel thereby to stop rotation of said rotor shaft.

7. A machine tool arrangement according to claim 1 wherein said arrangement further includes a final driven output shaft disposed around and splined to said driving spindle and a planetary reduction gear mechanism disposed coaxially between said output shaft and said rotor shaft of said main motor for allowing use of a high-speed electric motor as said main motor.

8. A machine tool arrangement according to claim 1 wherein said means for axially displacing said quill comprises a rack on the outer circumference of the quill, a worm meshing with said rack, said worm being supported rotatably by said quill housing, and means for driving said worm.

* * * * *